United States Patent
Paquet

(10) Patent No.: US 12,204,660 B2
(45) Date of Patent: *Jan. 21, 2025

(54) DISTRIBUTED DATA STORAGE SYSTEM PROVIDING ENHANCED SECURITY

(71) Applicant: Activision Publishing, Inc., Santa Monica, CA (US)

(72) Inventor: Philippe Louis Yves Paquet, Beverly Hills, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,678

(22) Filed: Dec. 22, 2023

(65) Prior Publication Data

US 2024/0126898 A1 Apr. 18, 2024

Related U.S. Application Data

(63) Continuation of application No. 17/563,155, filed on Dec. 28, 2021, now Pat. No. 11,853,439.

(60) Provisional application No. 63/131,944, filed on Dec. 30, 2020.

(51) Int. Cl.
  *G06F 21/60* (2013.01)
  *G06F 21/62* (2013.01)

(52) U.S. Cl.
  CPC ........ *G06F 21/606* (2013.01); *G06F 21/6227* (2013.01)

(58) Field of Classification Search
  USPC .......................................................... 726/26
  See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Sanchit K Sarker
(74) *Attorney, Agent, or Firm* — Novel IP

(57) ABSTRACT

In computer-implemented methods and systems for secure storage and transmission of data in a distributed network environment, each piece of data is transformed in to multiple pieces of metadata for transmission and storage. Each piece of metadata is transmitted and stored on a different server, which is selected from separate pools of servers.

16 Claims, 5 Drawing Sheets

(56) References Cited

U.S. PATENT DOCUMENTS

| | | |
|---|---|---|
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |

(56) References Cited

U.S. PATENT DOCUMENTS

| | | |
|---|---|---|
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,261,339 B2 * | 9/2012 | Aldridge ............ H04L 63/0272 726/3 |
| 8,265,253 B2 | 9/2012 | D Amora et al. |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,934,273 B1 * | 4/2018 | MacCarthaigh ...... G06F 16/285 |
| 11,640,474 B2 * | 5/2023 | Song ..................... G06F 21/33 726/27 |
| 2009/0113448 A1 | 4/2009 | Smith |
| 2014/0344725 A1 | 11/2014 | Bates |
| 2016/0191671 A1 | 6/2016 | Dawson |
| 2020/0076892 A1 * | 3/2020 | Surcouf ................. H04L 45/34 |
| 2022/0029989 A1 * | 1/2022 | Mathur ................. G06F 21/606 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100555637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |

(56) References Cited

FOREIGN PATENT DOCUMENTS

| | | |
|---|---:|---:|
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

DISTRIBUTED DATA STORAGE SYSTEM PROVIDING ENHANCED SECURITY

CROSS-REFERENCE

The present application is a continuation application of U.S. patent application Ser. No. 17/563,155, titled "Distributed Data Storage System Providing Enhanced Security" and filed on Dec. 28, 2021, which relies on, for priority, U.S. Patent Provisional Application No. 63/131,944, titled "Distributed Data Storage System Providing Enhanced Security" and filed on Dec. 30, 2020. The above-referenced applications are herein incorporated by reference in their entirety.

FIELD

The present specification discloses systems and methods for storage and transmission of data in a distributed network. More particularly, the present specification relates to increasing a security level of sensitive data during transmission and storage in a network.

BACKGROUND

Multiplayer video gaming systems, such as massive multiplayer online gaming systems, use distributed computing methods that enable players to cooperate, compete and communicate with each other. Distributed computing systems involve computing capabilities that are located on different computing devices within a network. The computing devices communicate with each other to coordinate their actions to enable data transmission and storage. Cloud computing systems are commonly used for transmission and storage of data using computer system resources over networks, such as the Internet. Data transmission over such a network is often subject to security threats from hackers and can be compromised in transit. Communication of data is prone to being intercepted by elements that intend to exploit the data. Similarly, transmitted data in a network that is stored in a computing device, such as a server, can be hacked by unknown elements. A common approach to address the concern over security of data during transmission use transport layer security (TLS).

Numerous techniques for securing data storage in a distributed pool of servers have been disclosed in the prior art. U.S. Pat. No. 9,753,931 teaches improving the security of data that is stored at a data store distributed over a computer network. Source data to be protected is partitioned into multiple files, and each file is obfuscated to create multiple obfuscated data files. Information as to how each obfuscated data file was obfuscated is stored in an associated trace file. The multiple obfuscated data files are moved around a computer network via a data movement process that includes sending each of the multiple obfuscated data files to a different randomly selected computer, where the computer further obfuscates the obfuscated data the trace file and sends the further obfuscated data and trace file to a next randomly selected computer.

U.S. Pat. No. 8,024,306 discloses system that use hash values as 'unique' identifiers for resources distributed across a network, and each one of a set of pool servers store the hash values for a set of computers within a LAN. When a resource is required, a hash value representing the resource is retrieved and compared with hash values stored at a pool server to determine whether the pool server holds a matching hash value. Any such matching hash value found on the pool server represents an identification of a local copy of the required resource, because of the uniqueness property of secure hash values. The information within the pool server can be used to access the required resource.

U.S. Pat. No. 10,474,643 teaches a distributed file system that includes metadata servers and data servers. The metadata server includes a selecting unit to select a data server from the data servers, a chunk allocation requesting unit to request that the selected data server perform chunk allocation, a chunk list managing unit to insert a list of chunks transmitted from the data server into a chunk list pool and determine an arrangement method of the chunk list pool, and a chunk fetching unit to fetch available chunk information from the chunk list pool. The data server includes a receiving unit to receive request for chunk allocation from the metadata server, a chunk allocating unit to allocate chunks in response to the request for chunk allocation and write a list of chunks based on information about the allocated chunk, and a transmitting unit to transmit the list of chunks to the metadata server.

While conventional approaches provide security for distributed data files, they generally still suffer from excessive complexity, security vulnerabilities, and/or substantial computing resources. Accordingly, there remains a need to improve the security of data storage and transmission in a distributed computing system. In particular, there is a need to store data in a manner that limits the extent to which individual servers have knowledge about the data that they store.

SUMMARY

The following embodiments and aspects thereof are described and illustrated in conjunction with systems, tools and methods, which are meant to be exemplary and illustrative, not limiting in scope.

In some embodiments, the present specification describes a computer-implemented method for securing data storage and transmission in a distributed network, the method being implemented in a computer having a processor and a random access memory, wherein the processor is in data communication with a storage unit, the method comprising: storing data in the network, wherein storing the data comprises: selecting a first set of servers, wherein each of the first set of servers is selected from different pools of servers; selecting a first server from the first set of servers; sending a data key to each of the first set of servers except for the selected first server; receiving a first set of metadata from each of the first set of servers except for the selected first server; and decomposing the first set of metadata; sending the data key and the first set of metadata to the first server; and retrieving stored data from the network, wherein retrieving the stored data comprises: selecting a second set of servers, wherein the second set of servers is selected from each of a plurality of a pool of servers; sending the data key to the second set of servers; receiving a second set of metadata associated with the data key from the second set of servers; and recomposing the data from the second set of metadata using the data key.

Optionally, the storing data in the network further comprises synchronizing the data key and the first set of metadata within each of the plurality of pools of servers.

Optionally, the second set of metadata is obtained from the synchronization.

Optionally, the decomposing comprises using a mathematical function to decompose the first set of metadata. Still optionally, the mathematical function is the Exclusive OR (EXOR) function.

Optionally, the recomposing comprises using a mathematical function to decompose the first set of metadata. Still optionally, the mathematical function is the Exclusive OR (EXOR) function.

Optionally, the data and the metadata has a length L. Still optionally, the sending the key of data to the first set of servers comprises sending the length L. Still optionally, the length L is predefined to be sufficiently long to accommodate a longest data string scenario. Still optionally, the storing the data comprises padding the data and the metadata with randomly generated data to achieve the length L. Optionally, the retrieving the stored data comprises eliminating the padding.

Optionally, the data key comprises a data structure.

Optionally, the data key comprises a string.

Optionally, the selecting the first set of servers comprises using Domain Name System to automatically select the first set of servers that has the fastest connection speed, relative to other servers, with the computer implementing the computer-implemented method.

Optionally, the connection speed has a latency of at least less than 100 ms and a bandwidth of at least 1 Gbps.

Optionally, the selecting the first set of servers comprises receiving a list of servers available in each pool of servers and randomly choosing one server from each pool of servers.

Optionally, the sending the data key comprises sending a key adapted to identify the data.

In some other embodiments, the present specification describes a computer-implemented method for securing data storage and transmission in a distributed network, the method being implemented in a computer having a processor and a random access memory, wherein the processor is in data communication with a storage unit, the method comprising: storing data in the network, wherein storing the data comprises: selecting a first set of servers, wherein each of the first set of servers is selected from different pools of servers; selecting a first server from the first set of servers; sending a data key to each of the first set of servers except for the selected first server; receiving a first set of metadata from a second server and a third server from the first set of servers; and decomposing the first set of metadata received from the second server and the third server from the first set of servers; sending the data key and the first set of metadata to the first server; and retrieving stored data from the network, wherein retrieving the stored data comprises: selecting a second set of servers, wherein the second set of servers is selected from each of a plurality of a pool of servers; sending the data key to the second set of servers; receiving a second set of metadata associated with the data key from the second set of servers; and recomposing the data from the second set of metadata using the data key.

Optionally, storing data in the network further comprises synchronizing the data key and the first set of metadata within each of the plurality of pools of servers. The second set of metadata may be obtained from the synchronization.

Optionally, decomposing comprises using a mathematical function to decompose the first set of metadata. The mathematical function may be the Exclusive OR (EXOR) function.

Optionally, the recomposing comprises using a mathematical function to decompose the first set of metadata. The mathematical function may be the Exclusive OR (EXOR) function.

Optionally, the data and the metadata has a length L. Optionally, sending the key of data to the first set of servers comprises sending the length L.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

Figure 1:
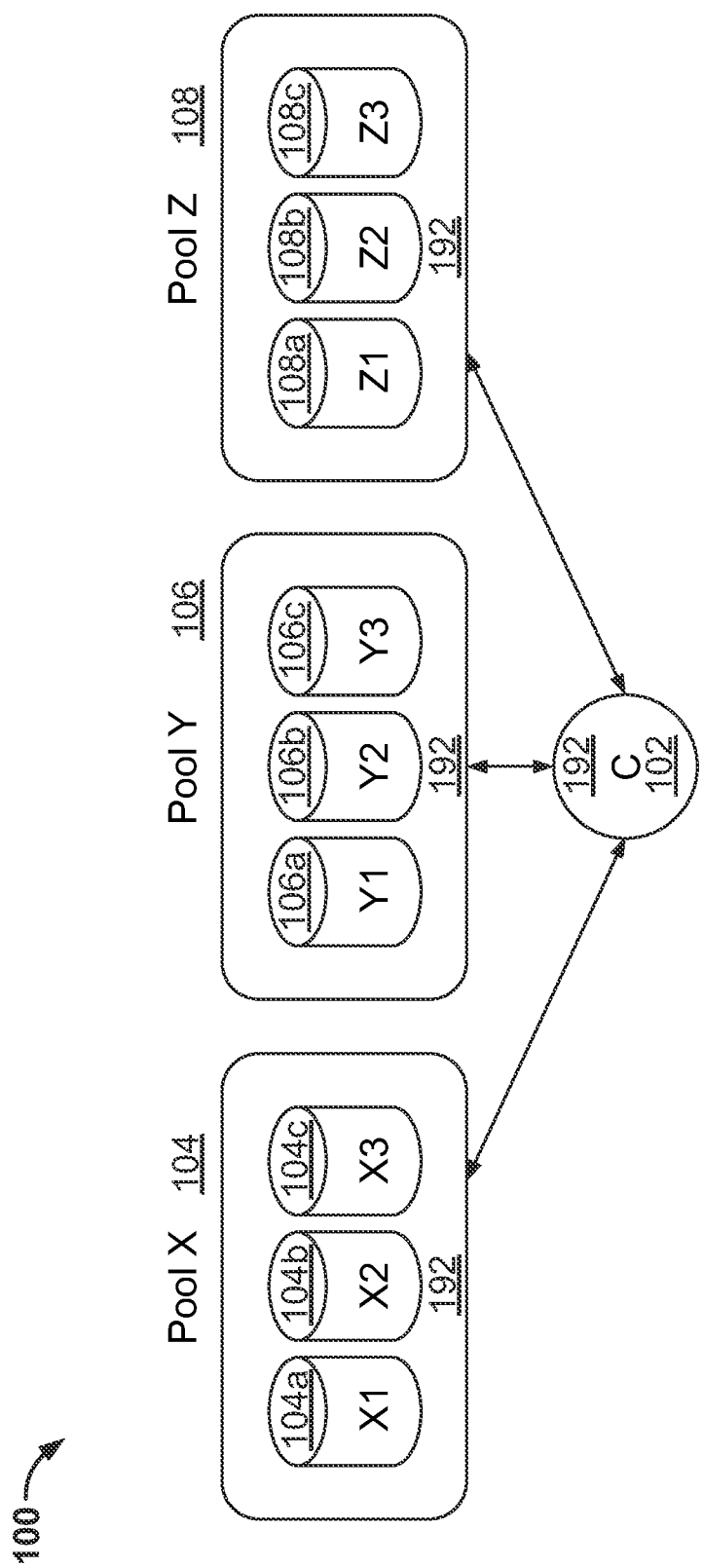
FIG. 1 illustrates an exemplary network architecture according to some implementations of the present specification.

The present specification relates to security systems and methods in distributed computing systems. Embodiments of the present specification provide a method for storing and transmitting data to enhance or increase a security level of the data. The present specification teaches a secure and resilient data storage system and method whereby storage is distributed across a pool of servers and, apart from an index key for identifying the data and length of the data, individual servers do not have knowledge of or about the data that they store. Accordingly, each piece of data is transformed into multiple pieces of metadata, whereby each piece of metadata is then transmitted and stored on a different server. Each server is selected from a pool of servers. Therefore, individually, none of the pieces of data yield any information about the data itself during transmission, since storage is distributed across a pool of servers. Further, should there be an attack, the hacker is forced to compromise all servers where the metadata is stored and intercept communication to all servers (instead of hacking and intercepting just one server), which is difficult and nearly impossible. One of ordinary skill in the art would appreciate that a single server pool is, logically, an autonomous region that contains one or more physical servers, presenting a unified view of the storage in which the virtual machines reside. This is opposed to different server pools in which servers in the different pools present a differing view of the storage.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

It should be appreciated that the programmatic methods described herein may be performed on any computing device, including a laptop, desktop, smartphone, tablet computer, specialized gaming console, or virtual reality system. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

The embodiments disclosed herein are directed to an improvement in secure transmission and storage of sensitive data including and not limited to credit card data, social security number (SSN) related data, and other data that requires secure transmission and storage. The embodiments disclosed herein are also directed to an improvement in computer-related technology (enabling computers to enable secure gaming experiences in an online multiplayer gaming environment), and thus do not recite abstract ideas or concepts. The improved secure transmission and storage of data are achieved through the use of specific rules to communicate data such as player data within the gaming environment which, when executed, enable the automation of specific content generation, transmission, and storage of data that previously were not available or could not be automated. These new secure data transmission and storage rules for communication between computing devices improve existing technological processes in distributed computing and, therefore, are not abstract or conceptual in nature. This specification therefore teaches how the disclosed inventions improve a secure communication technology using a specific set of rules, and particular solutions to the aforementioned failures in conventional communication systems to achieve the desired outcomes.

While aspects of the present specification may be described herein with reference to various gaming systems and players of online gaming systems, it should be appreciated that any such examples are for illustrative purposes only, and are not intended to be limiting.

The terminology used within this specification and detailed description of the various embodiments is for the purpose of describing particular embodiments only and is not intended to limit the invention.

The term "a multiplayer game environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably, the plurality of client devices number in the dozens, preferably hundreds, preferably thousands. In one embodiment, the number of concurrently supported client devices ranges from 10 to 5,000,000 and every whole number increment or range therein. Accordingly, a multiplayer game environment or massively multiplayer online game is a computer-related technology, a non-generic technological environment, and should not be abstractly considered a generic method of organizing human activity divorced from its specific technology environment.

In embodiments, the term "metadata" may refer to any set of randomly generated data (such as, but not limited to numbers or binary numbers).

Exemplary System Architecture

FIG. 1 illustrates an exemplary network architecture 100 according to some implementations of the present specification. Network architecture 100 may be used to implement various embodiments described in subsequent sections of the present specification. For example, network architecture 100 may implement various programs that result in improved security of data transmission and storage in the network.

FIG. 1 illustrates a client device C 102 that is configured to transmit, store, and retrieve data through communication to multiple servers. Each server is assigned to one of several pools of servers. A first pool X 104 comprises servers X1 104*a*, X2 104*b*, and X3 104*c*. A second pool Y 106 comprises servers Y1 106*a*, Y2 106*b*, and Y3 106*c*. A third pool Z 108 comprises servers Z1 108*a*, Z2 108*b*, and Z3 108*c*. FIG. 1 illustrates a representative set of server pools 104, 106, and 108. The actual pools of servers may vary in numbers and the numbers of servers in each pool may also vary. In embodiments, at least two pools of n servers are employed. In a preferred embodiment, at least three pools of n servers are employed for increased security. In embodiments, each pool of servers has at least three individual servers which may increase resilience. In some embodiments, each pool of servers may operate using a different operating system or network/communication protocol. A single pool of servers may be defined as a logically autonomous processing or computing system that is made of two or more physical servers. A pool of servers provides a unified view of the data present throughout the pool of servers and are typically defined by a software program that is configured to integrate, associate, or otherwise link an IP address associated with one of the physical servers in the pool with IP addresses of other physical servers in the pool.

In an embodiment, client device C 102 is a computer system that is configured to host gameplay between (or with) other devices. Client device C 102 may be configured as a gaming console, a handheld gaming device, a personal computer (e.g., a desktop computer, a laptop computer, etc.), a smartphone, a tablet computing device, a smart television, and/or other device that can be used to communicate data. Client device C 102 may include one or more processors, one or more storage devices (which may store one or more applications), one or more peripherals, and/or other components. Processors may be programmed by one or more computer program instructions. For example, processors may be programmed by the application and/or other instructions. The other devices may include other computing systems which may, similar to client device C 102, perform data transmission and request for storage of data within the network architecture 100.

Depending on the system configuration, an application (or portions thereof) may be part of a game application, which generates a game instance to facilitate gameplay. Alternatively or additionally, the application may run on a device such as a server to perform its designated function(s) for users in an "online" game hosted by the server. In embodiments, portions or all of the application 192 may run on computer system of client C 102 and/or at least one server among the pools 104, 106, 108 of servers.

The application may include programmatic instructions to be implemented by a computing system in client C 102 and in servers in the pools 104, 106 and 108, each of which are described in greater detail herein. Servers in pools 104, 106, and 108 may include one or more computing devices. The servers may include one or more physical processors programmed by computer program instructions, one or more storage devices (which may store the application), and/or other components. The processors may be programmed by one or more computer program instructions. As used herein, for convenience, the various instructions will be described as performing an operation, when, in fact, the various instructions program the processors in the computer system of client C 102 and servers in pools 104, 106 and 108, to perform the operation.

At least one peripheral may be used to obtain an input (for example, direct input, measured input, among other types of input) from a user at client C 102. Data input is securely transmitted and stored by the application executed within the distributed network architecture 100. The at least one peripherals may include, without limitation, a game controller, a gamepad, a keyboard, a mouse, an imaging device such as a camera, a motion sensing device, a light sensor, a biometric sensor, and/or other peripheral device that can obtain an input from and/or relating to a user. In some embodiments, the user is a player of the online game. Peripherals may be coupled to a corresponding client C 102 via a wired and/or wireless connection.

Although illustrated in FIG. 1 as a single component, client device C 102 and servers in pools 104, 106, and 108 may each include a plurality of individual processing components, each programmed with at least some of the functions described herein. In this manner, some components of client device C 102 and servers in pools 104, 106, and 108 may perform some functions while other components may perform other functions, as would be appreciated. The one or more processors may each include one or more physical processors that are programmed by computer program instructions. Thus, any one or all of client device C 102 and servers in pools 104, 106, and 108 may function as a host computer programmed by the application. The various instructions described herein are exemplary only. Other configurations and numbers of instructions may be used, so long as the processor(s) are programmed to perform the functions described herein.

The various programmatic instructions described herein may be stored in a storage device which may comprise random access memory (RAM), read only memory (ROM), and/or other memory. The storage device may store the computer program instructions (e.g., the aforementioned instructions) to be executed by the processor as well as data that may be manipulated by processor. The storage device may comprise floppy disks, hard disks, optical disks, tapes, or other storage media for storing computer-executable instructions and/or data. Furthermore, it should be appreciated that although the various storage devices housing the instructions are illustrated in FIG. 1 as being co-located within a single processing unit, in implementations in which the processor(s) include multiple processing units, one or more instructions may be executed remotely and discretely from the other instructions.

The description of the functionality provided by the different instructions described herein is for illustrative purposes, and is not intended to be limiting, as any of the programmatic instructions may provide more or less functionality than is described. For example, one or more of the instructions may be eliminated, and some or all of its functionality may be provided by any of the other instructions. As another example, the processor(s) may be programmed by one or more additional instructions that may perform some or all of the functionality attributed herein to one of the instructions.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in the other Figures, different numbers of entities than those depicted may be used. Furthermore, according to various implementations, the components described herein may be implemented in hardware and/or software that configure hardware.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2A:
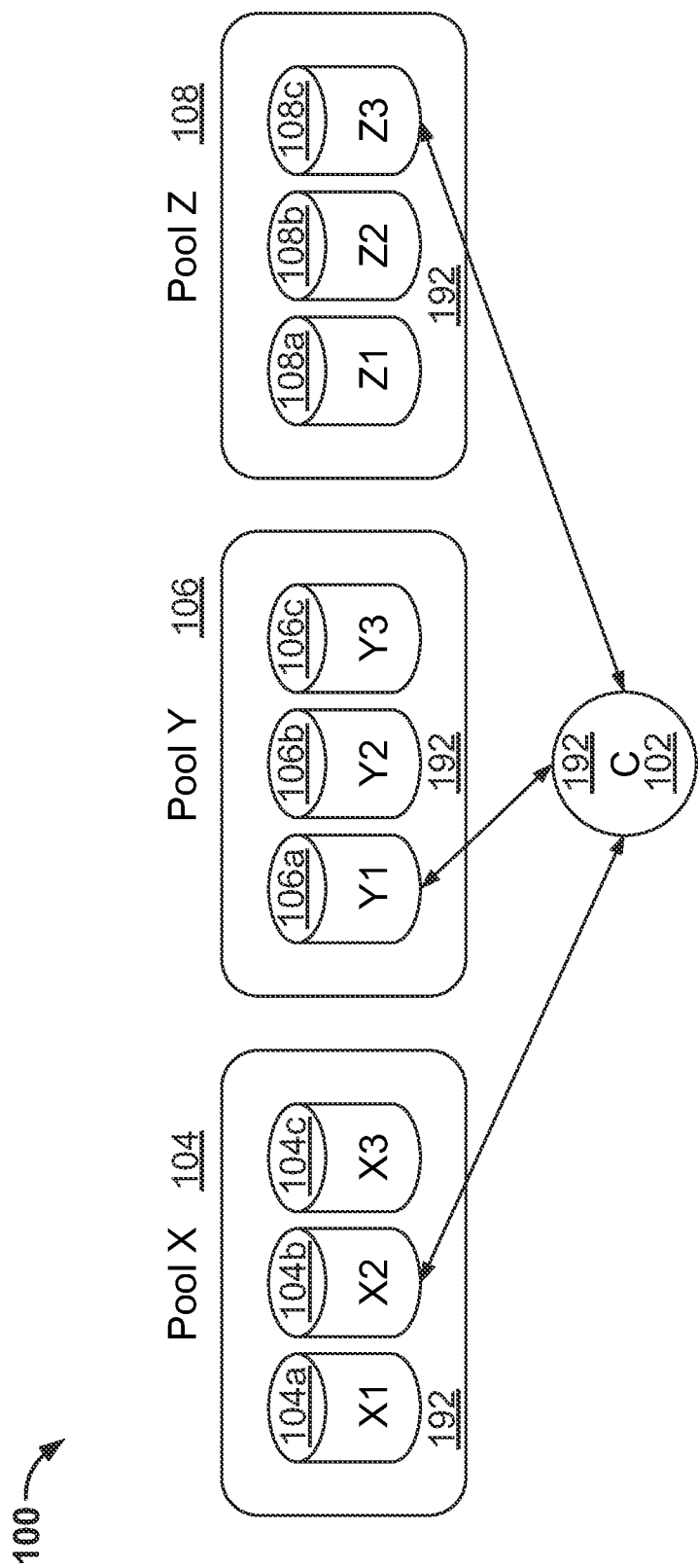
FIG. 2A illustrates an exemplary interaction between components of the distributed network performed during storage of data by a client, in accordance with some embodiments of the present specification.
Figure 2B:
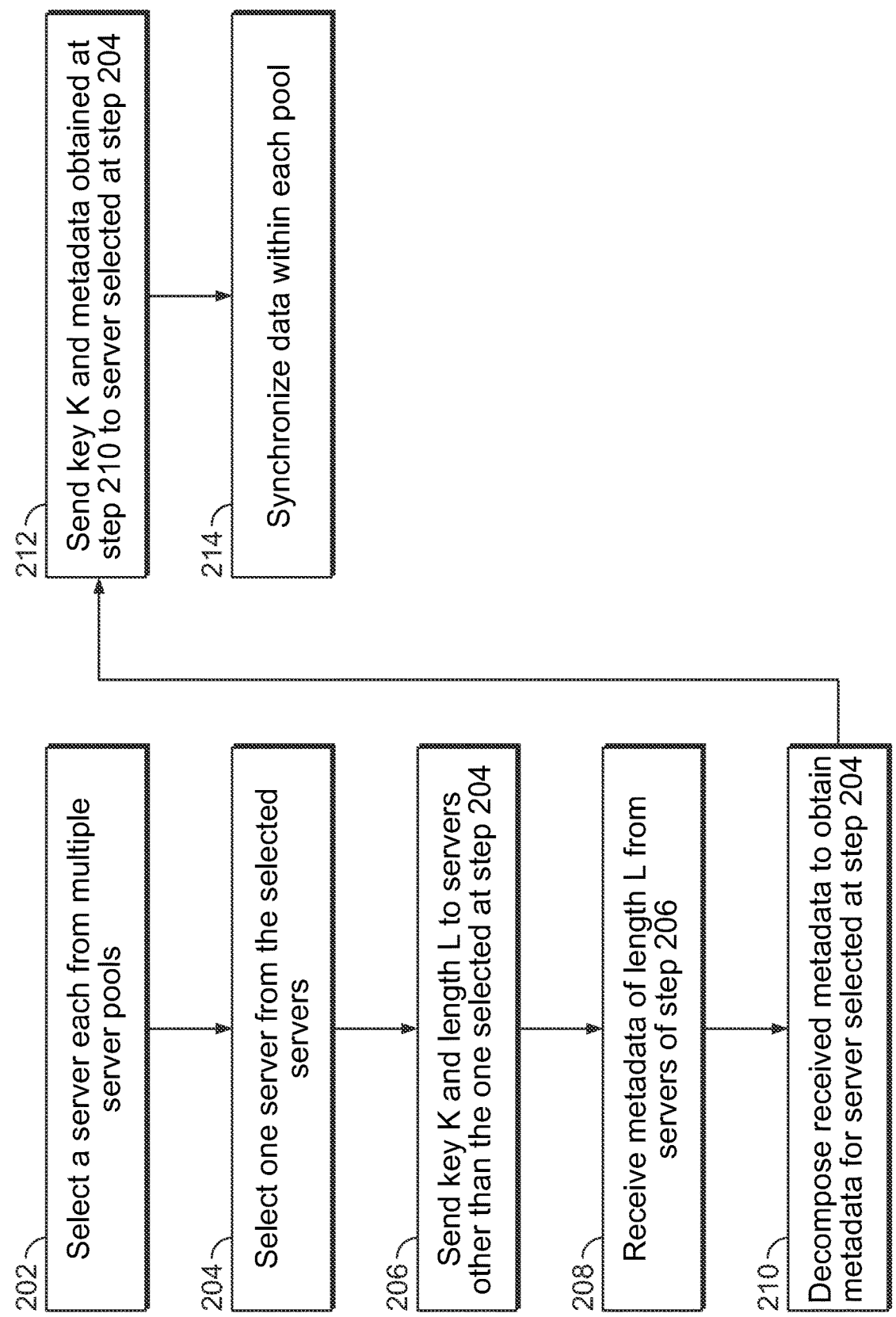
FIG. 2B is a flow diagram detailing an exemplary process used for storage of data by the client, in accordance with some embodiments of the present specification.

FIG. 2A illustrates an exemplary interaction between components of the distributed network architecture 100 performed during storage of data (D) by client device C 102, in accordance with some embodiments of the present specification. FIG. 2B is a flow diagram showing an exemplary process used for storage of data (D) by client device C 102, in accordance with some embodiments of the present specification. Referring simultaneously to FIGS. 2A and 2B, at step 202, client device C 102 selects at least one server from each of the plurality of pools of servers. In one embodiment, step 202 is performed implicitly, where Domain Name System (DNS) is used to automatically select the server in a pool that will have a faster connection to client C 102, relative to other servers. In embodiments, connection speed is measured based on the latency for pinging a server from the client and/or based on the available bandwidth for communication between the client and server. Connection speed for a certain server is relative to connection speed for the other services and, when step 202 is performed implicitly, the fastest connection is chosen. In some embodiments, when step 202 is performed implicitly, the connection speed has a latency of at least less than 100 ms and a bandwidth of at least 1 Gbps. In another embodiment, step 202 is performed explicitly, where client C 102 receives a list of the servers available in each pool and randomly chooses one. In embodiments, the selection is performed randomly by client device C 102. In the example, servers X2 104b, Y1 106a, and Z3 108c, are selected from pools 104, 106 and 108, respectively. At step 204, client C device 102 randomly selects one server from the servers X2 104b, Y1 106a, and Z3 108c selected at step 202, for storage of data. In the illustrated example, server Y1 106a is selected at this step 204.

At step 206, client device C 102 sends a key (K) having a length (L) of data to the servers X2 104b and Z3 108c, which were not selected at step 204. The same K and L are sent to the servers. The key (K) represents a data structure adapted to identify the data (D) that is being stored and will subsequently be retrieved. In embodiments, key (K) is a string, or any other format that can enable subsequent retrieval of the original data. The length (L) represents the length of the data (D). In embodiments, different lengths of data may be used by client device C 102. In some embodiments, client device C 102 uses a specific length L to represent the data (D). In embodiments, length (L) is predefined so that the server does not need to know the length since it is consistent throughout. In case of predefined length (L), such as a credit card number, the length does not need to be communicated to the servers. In alternate embodiments, if length (L) is variable, the length is required to be communicated to the servers. In embodiments, client device C 102 determines the type of data (D) that is being processed for storage and subsequent retrieval. The type of data (D) is known to client C 102 from the application storing the data, such as a SSN or credit card number. The known type of data (D) enables client (C) 102 to use appropriate storage with the server, since the length of data is fixed and there is no need to communicate L. Alternatively, client (C) 102 uses generic storage and communicates the length (L) to the servers. In one embodiment, a first type of data is a Social Security Number (SSN) which has a first length and a second type of data is a credit card (CC) number which has a second, different length. Client device C 102 may pad or augment the original data with randomly generated data to achieve a predefined length L. In embodiments, while uniform length L of data is not required in all scenarios, there are advantages to predefine length such as speed and predictability of storage. In embodiments, length L is predefined to be sufficiently long to accommodate the longest data string scenario. Once the data is processed for storage and subsequently recomposed, client device C 102 eliminates the padding, since the type of data is known to client device C 102, and therefore client device C 102 can determine the amount of padding.

At step 208, client device C 102 receives metadata returned by the servers X2 104b and Z3 108c. In the illustrated example, server X2 104b returns to the client device C 102 DX2 metadata which is randomly generated and has a length L. Similarly, server Z3 108c returns to the client device C 102 DZ3 metadata which is randomly generated and has a length L. Key (K) is communicated back to the servers by client device C 102 alongside, or implied, similarly to an answer to a web API call. Additionally, server X2 104b now stores key K that is associated with metadata DX2, and server Z3 108c stores key K that is associated with metadata DZ3.

At step 210, client C 102 decomposes the data to obtain metadata associated with the server Y1 106a selected at step 204. In one embodiment, the Exclusive OR (EXOR/EOR, denoted by symbol ^) algorithmic function is used to decompose, and therefore subsequently recompose, the data. While some embodiments of the present specification are described with reference to the use of EXOR, it should be appreciated that EXOR is only one of the possible methods to decompose/recompose the data. Other mathematical operations and/or functions may be used in place of EXOR to achieve the objectives prescribed by the present specification. For example, addition or subtraction functions may be used in place of EXOR. Using the EXOR function enables storing an arbitrary data length and having a predictable computational time. In embodiments, any length L may be selected as long as that length is uniform across all servers and data. However, in order to use EXOR it should be noted that binary data of equal lengths (L) must be compared. When the client decomposes the data, the data is represented by:

$$DY1 = D \char`\^ DX2 \char`\^ DZ3$$

At step 212, client device C 102 sends key K and metadata DY1 to server Y1 106a. At this point, server X2 104b stores K and metadata DX2, server Y1 106a stores K and metadata DY1, and server Z3 stores K and metadata DZ3. Additionally, data D required to be stored by C 102 is now represented as:

$$D = DX2 \char`\^ DY1 \char`\^ DZ3$$

Further, at step 214, the metadata (DX2, DY1, DZ3) stored within each server (X2 104b, Y1 106a, Z3 108c) is synchronized with the pool corresponding to each server. In some embodiments, the synchronization is performed to address availability of the overall system and make interception of the communication more difficult. If a server is not available or communication to that server is not possible, any other server in the same pool can be used to successfully complete the transaction. Intercepting communication to all the servers participating in a transaction is harder as communication will have to either be intercepted at all the servers or at all the clients. In the illustrated example, server X2 104b sends K and its associated metadata DX2 to servers X1 104a and X3 104c. Similarly, server Y1 106a sends K and its associated metadata DY1 to servers Y2 106b and Y3 106c. Server Z3 108c sends K and its associated metadata DZ3 to servers Z1 108a and Z2 108b. The data is synchronized between servers in a pool so that subsequently, the retrieval of data can be managed without the knowledge of the original server that stored the metadata.

Figure 3A:
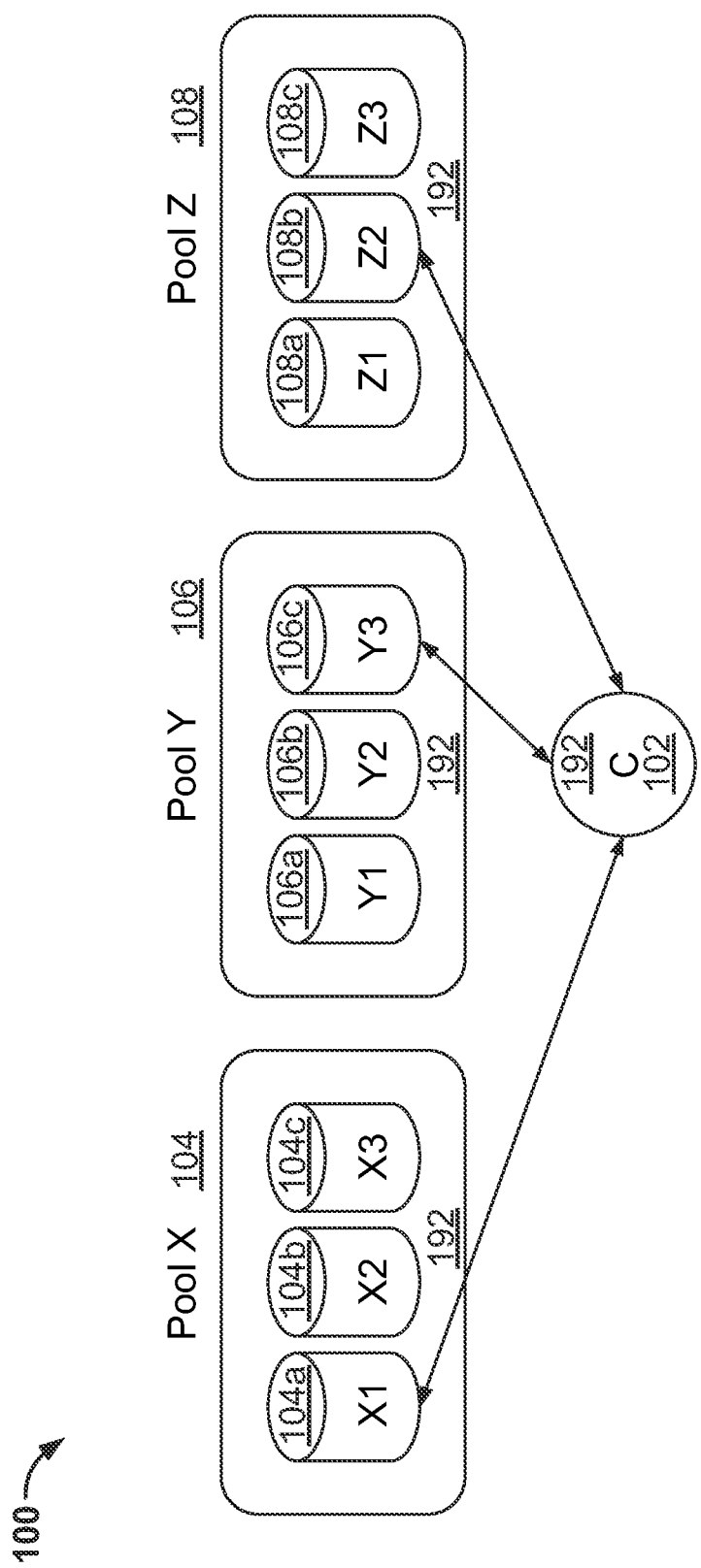
FIG. 3A illustrates an exemplary interaction between components of the distributed network performed during retrieval of data by the client, in accordance with some embodiments of the present specification.
Figure 3B:
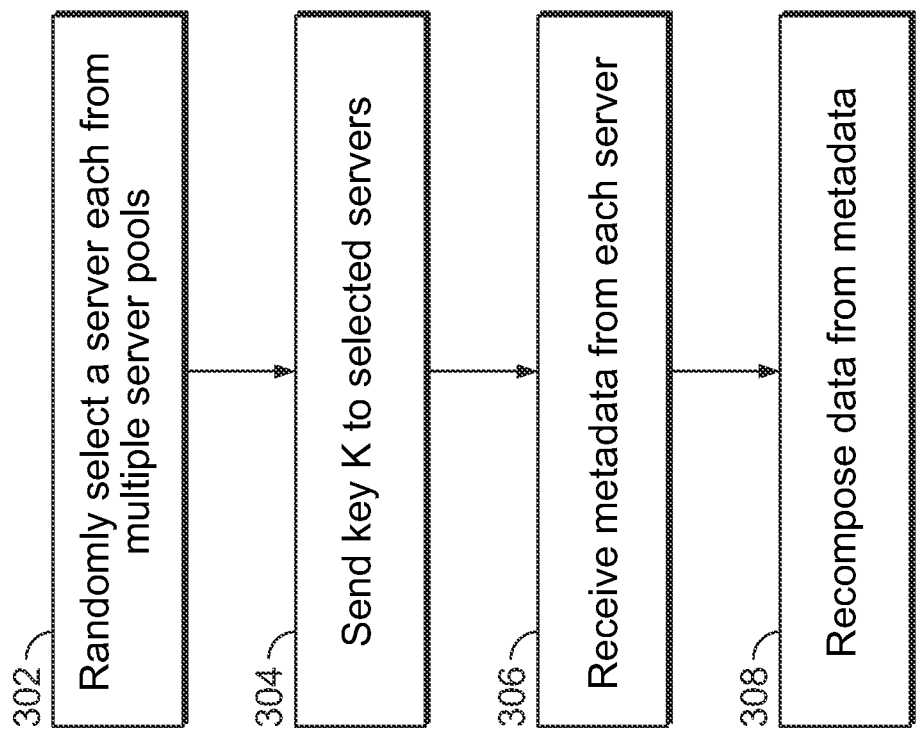
FIG. 3B is a flow diagram detailing an exemplary process used for retrieval of data by the client, in accordance with some embodiments of the present specification.

FIG. 3A illustrates an exemplary interaction between components of the distributed network architecture 100 performed during retrieval of data (D) by client device C 102, in accordance with some embodiments of the present specification. FIG. 3B is a flow diagram showing an exemplary process used for retrieval of data (D) by client device C 102, in accordance with some embodiments of the present specification. Referring simultaneously to FIGS. 3A and 3B, at step 304 client device C 102 randomly selects at least one server from each of the plurality of server pools within the network 100. For example, client device C 102 selects server X1 104a from pool 104, server Y3 106c from pool 106, and server Z2 108b from pool 108. At step 304, client C 102 sends a key K to each server (X1 104a, Y3 106c and Z2 108b) selected at step 302. At step 306, each selected server (X1 104a, Y3 106c and Z2 108b), in response to the key K sent by client device C 102, returns to client device C 102 metadata that was previously provided while synchronizing the servers within each pool. Therefore, in the example shown, server X1 104a returns to client C 102 metadata DX1, server Y3 106c returns to client device C 102 metadata DY3, and server Z2 108b returns to client device C 102 metadata DZ2. At step 308, after receiving metadata from the selected servers (X1 104a, Y3 106c, Z2 108b) from each of the plurality of the pool of servers (104, 106, and 108), client C 102 recomposes the stored data D using the designated mathematical function. In the illustrated example, the EXOR function is used. Therefore, client C 102 recomposes the data D using EXOR:

$$D = DX1\char`\^ DY3\char`\^ DZ2$$

Embodiments of the present specification offer several advantages. The sensitive data (D) itself is never transmitted over the network 100. A partial metadata (DX, DY, DZ) is used to recreate the data (D). Additionally, the sensitive data (D) itself is never stored anywhere on the network 100 since partial metadata (DX, DY, DZ) are used. Further, security of storing the sensitive data D is improved by the embodiments of the present specification since an attacker is faced with the difficult task of compromising at least one server in multiple pools of servers in order to acquire the data D. In some embodiments, the servers are operated using different technologies and are secured with different security measures, making it even harder to acquire the data D.

Also, data transmission security is improved by embodiments of the present specification, since in order to intercept the data D, an attacker is required to intercept all the transmissions from all the servers in the multiple pools of servers. It may be difficult for the attacker to intercept data because the attacker does not likely know, in advance, which individual servers located within the pool of servers will be selected by the client for storage and retrieval of data D. Additionally, if the transmission of the data is based on different technologies and with different security measures for each server, depending on the server pool, the task of intercepting the sensitive data D is even harder.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A system for securing data storage and transmission in a network comprising at least a first server pool and a second server pool, wherein first server pool comprises a first plurality of servers and wherein the second server pool comprises a second plurality of servers, the system comprising:

first programmatic instructions stored in a non-transient computer medium wherein, when executed by a processor, the first programmatic instructions cause data to be stored in the network by selecting a first server of the first plurality of servers from the first server pool and selecting a second server of the second plurality of servers from the second server pool, wherein the first server has a faster connection speed than other servers of the first plurality of servers and wherein the second server has a faster connection speed than other servers of the second plurality of servers;

second programmatic instructions stored in the non-transient computer medium wherein, when executed by the processor, the second programmatic instructions select the first server;

third programmatic instructions stored in the non-transient computer medium wherein, when executed by the processor, the third programmatic instructions send a data key to the second server and not the first server;

fourth programmatic instructions stored in the non-transient computer medium wherein, when executed by the processor, the fourth programmatic instructions receive a first set of metadata from the second server;

fifth programmatic instructions stored in the non-transient computer medium wherein, when executed by the processor, the fifth programmatic instructions decompose the first set of metadata using a mathematical function; and sixth programmatic instructions stored in the non-transient computer medium wherein, when executed by the processor, the sixth programmatic instructions send the data key and the first set of metadata to the first server;

seventh programmatic instructions stored in the non-transient computer medium wherein, when executed by the processor, the seventh programmatic instructions select a third server of the first plurality of servers, select a fourth server of the second plurality of servers, send the data key to at least one of the third server and fourth server, receive a second set of metadata associated with the data key from at least one of the third server and fourth server, and recompose the received second set of metadata using the data key.

2. The system of claim 1, wherein the seventh programmatic instructions sending the data key to at least one of the third server and fourth server comprises sending a key adapted to identify the data.

3. The system of claim 1, wherein the seventh programmatic instructions recomposing the second set of metadata comprises using the same mathematical function used to decompose the first set of metadata.

4. The system of claim 1, wherein the mathematical function is the Exclusive OR (EXOR) function.

5. The system of claim 1, further comprising eighth programmatic instructions stored in the non-transient computer medium wherein, when executed by the processor, the eighth programmatic instructions synchronize the data key and the first set of metadata.

6. The system of claim 5, further comprising ninth programmatic instructions stored in the non-transient computer medium wherein, when executed by the processor, the ninth programmatic instructions obtain a second set of metadata from the synchronization.

7. The system of claim 1, wherein the data and the metadata has a length L.

8. The system of claim 7, wherein the third programmatic instructions sending a data key to the second server and not the first server comprises sending the length L.

9. The system of claim 7, wherein the length L is predefined to be sufficiently long to accommodate a longest data string scenario.

10. The system of claim 7, wherein the first programmatic instructions causing the data to be stored in the network comprises padding the data and the metadata with randomly generated data to achieve the length L.

11. The system of claim 10, further comprising eighth programmatic instructions stored in the non-transient computer medium wherein, when executed by the processor, the eighth programmatic instructions retrieve stored data from the network and wherein the retrieving the stored data comprises eliminating the padding.

12. The system of claim 1 wherein the data key comprises a data structure.

13. The system of claim 1 wherein the data key comprises a string.

14. The system of claim 1, wherein the connection speed has a latency of at least less than 100 ms and a bandwidth of at least 1 Gbps.

15. The system of claim 1, wherein the first plurality of servers is chosen randomly from a list of servers available in the first pool of servers.

16. The system of claim 1, wherein the second plurality of servers is chosen randomly from a list of servers available in the second pool of servers.

* * * * *